United States Patent [19]

Forgash et al.

[11] Patent Number: 5,313,864
[45] Date of Patent: May 24, 1994

[54] PLASTIC STRAND PELLETIZER

[75] Inventors: Anthony R. Forgash, Bay City; Henry E. Richardson, Gladwin, both of Mich.

[73] Assignee: The Conair Group, Inc., Pittsburgh, Pa.

[21] Appl. No.: 966,300

[22] Filed: Oct. 26, 1992

[51] Int. Cl.⁵ ............................................ B26D 7/00
[52] U.S. Cl. ........................................ 83/349; 83/436; 83/860; 83/906
[58] Field of Search ............... 83/859, 860, 342, 349, 83/436, 906, 913, 649, 650; 264/143; 425/71; 225/11, 12, 13, 14, 15, 16

[56] References Cited

U.S. PATENT DOCUMENTS

| | | | |
|---|---|---|---|
| 1,543,183 | 6/1925 | Mortimer | 83/649 X |
| 2,739,647 | 3/1956 | Coste | 83/906 X |
| 3,971,279 | 7/1976 | Wright | 83/649 X |
| 4,664,006 | 5/1987 | Mitchell | 83/349 X |
| 4,938,111 | 7/1990 | Massé | 83/436 X |
| 4,949,606 | 8/1990 | Pfeiffer | 83/342 X |

Primary Examiner—Rinaldi I. Rada
Attorney, Agent, or Firm—Buchanan Ingersoll

[57] ABSTRACT

A strand pelletizer for cutting thermoplastic strands into pellets is provided. The strand pelletizer has a housing that includes a base, a pivotable cover, and a moveable end wall. The pivotable cover and the movable end wall may be opened without the use of tools to provide access to the interior of the pelletizer cutting chamber. The movable end wall is both slideable and pivotable over a fixed dowel pin within the housing base. The moveable end wall houses the feed rolls for the pelletizer and also houses the strand inlet to the pelletizer. After the cover is raised, the moveable end wall may be pivoted away from the cutting chamber to permit cleaning of the interior of the cutting chamber, particularly the critical area below the lower feed roll of the cutting chamber.

17 Claims, 3 Drawing Sheets

PLASTIC STRAND PELLETIZER

BACKGROUND OF THE INVENTION

1. Field of the Invention

This invention relates to an improved plastic strand pelletizer for cutting thermoplastic material into pellets after it is formed into strands and cooled. The improved pelletizer includes a novel housing arrangement which permits ready access to the cutting chamber of the pelletizer for cleaning and maintenance of the component parts.

2. Description of the Prior Art

Plastic strand pelletizers have been utilized for many years to cut cylindrical strands of thermoplastic material into short cylindrical pellets. The pellets are transshipped to plastic product manufacturers where they are melted and utilized to produce plastic products as, for example, in injection molding machines. Plastic pellet suppliers exercise great effort in order to produce plastic pellets that are uniform in size and shape and that do not contain contaminants which would adversely affect the finished plastic product that is manufactured from the pellets.

In prior plastic strand pelletizers, contamination of the product could result since it was difficult to have access to the cutting chamber of the pelletizer to clean it. If, for example, the initial batch of pellets formed from a specific run of plastic was not up to standard because the plastic had not been thoroughly mixed before the first run of strands was produced, the bad pellets might become lodged within the pelletizer and be passed later into a good pellet mix thereby contaminating the good pellets.

Some examples of plastic strand pelletizers and the systems in which they are utilized are set forth in the following patents: U.S. Pat. No. 2,975,483; U.S. Pat. No. 3,186,277; U.S. Pat. No. 3,519,706; U.S. Pat. No. 3,808,929; U.S. Pat. No. 4,413,965; U.S. Pat. No. 4,759,248; U.S. Pat. No. 4,806,298; U.S. Pat. No. 4,960,020; and U.S. Pat. No. 5,146,822.

SUMMARY OF THE INVENTION

In accordance with the present invention, a strand pelletizer having a cutter, a bed knife, and an upper and lower feed roll for feeding strands to the cutter is improved by providing a three part housing including a cover, an end wall and a base enclosing the cutting chamber. The housing cover is pivotally secured to the housing base so that the cover may be pivoted away from the base to provide access to the cutter and a portion of the mounting means for the upper feed roll. Hand operated means is provided for selectively locking the housing cover in a closed operating position relative to the base. The housing end wall retains the upper feed roll and lower feed roll and is slideable and pivotable relative to the base to provide access to the feed rolls for maintenance and cleaning. Hand operated means is provided for selectively locking the housing end wall in a vertical operating position relative to the base. The base has an upwardly projecting portion that fixedly positions the bed knife relative to the cutter. An inlet to the cutting chamber is provided to direct plastic strands between the upper and lower feed rolls. The upper and lower feed rolls are positioned to feed the plastic strands over the bed knife when the housing end wall is locked in its vertical operating position.

Accordingly, an object of the present invention is to provide an improved strand pelletizer for pelletizing extruded plastic strands.

Another object of the present invention is to provide a pelletizer having an arrangement of parts which permits ready access to the cutter, bed knife and feed rolls of the pelletizer.

Another object of the present invention is to provide a pelletizer which permits ready access to the area below the feed rolls for cleaning.

These and other objects of this invention will become apparent as this description proceeds in conjunction with the accompanying drawings and the appended claims.

DESCRIPTION OF THE PREFERRED EMBODIMENT

Figure 1:
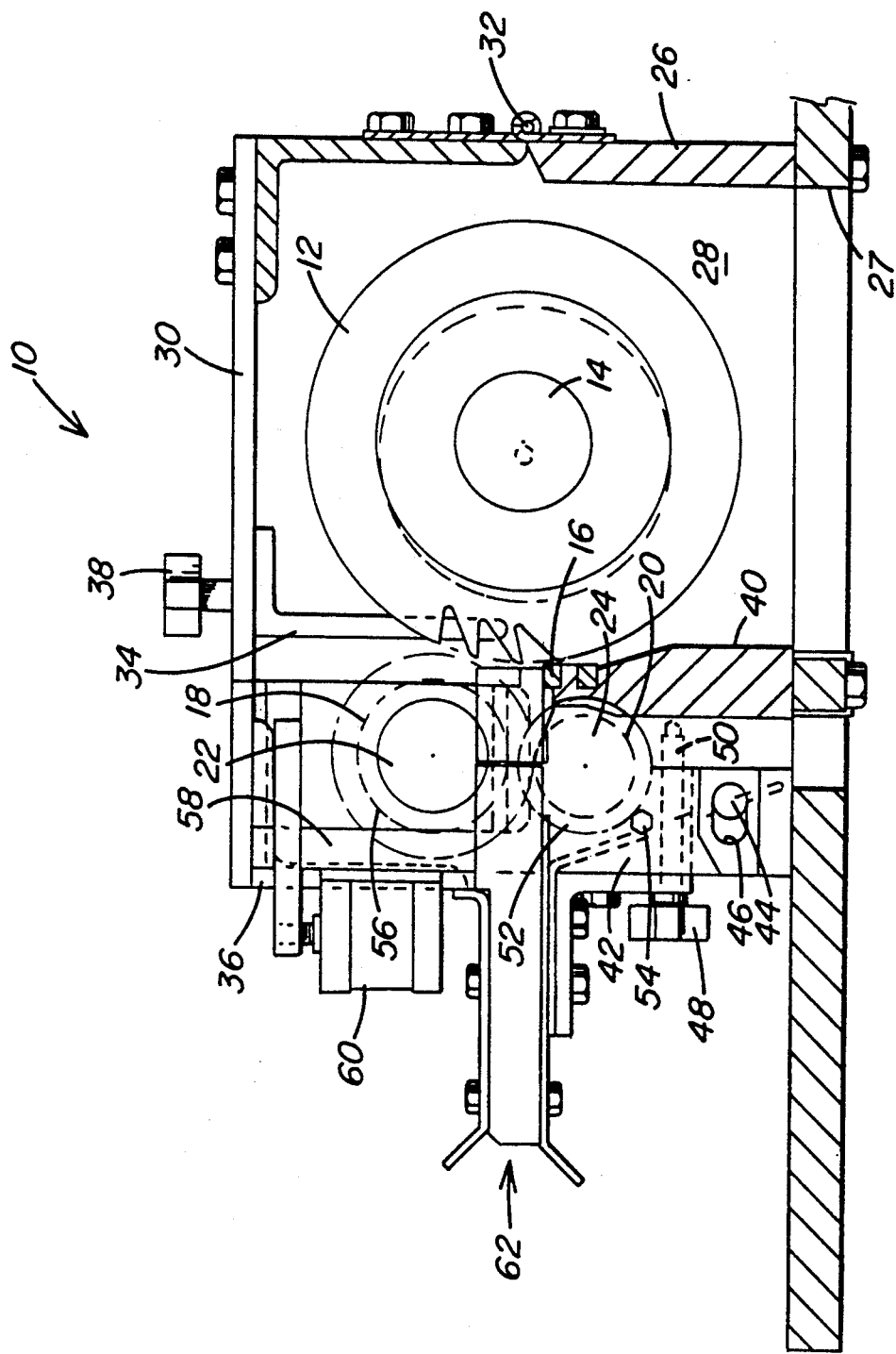
FIG. 1 is a side elevational view of the improved pelletizer of the present invention in its operating position.

Referring to the drawings, there is shown a strand pelletizer 10 having a standard helical cutter 12 that is mounted on a shaft 14 and driven by a power source (not shown). The cutter cooperates with a bed knife 16 in standard fashion to cut plastic strands that enter into the pelletizer 10 into short, cylindrically shaped pellets.

An upper feed roll 18 and a lower feed roll 20 are mounted on shafts 22 and 24, respectively, and are driven by a power source (not shown) to draw strands between them and feed the strands to the cutter 12. The feed rolls 18 and 20 are sometimes referred to as "nip rolls." The housing of the strand pelletizer 10 includes a base 26 which is preferably formed of stainless steel. The base 26 includes upstanding side walls 28 and a lower portion having an opening 27 formed therein to permit the pellets cut by cutter 12 to fall from the pelletizer to be thereafter conveyed away from the pelletizer. Side walls 28 of pelletizer base 26 receive and support the cutter shaft 14 and maintain the cutter in position.

A cover 30 preferably formed from aluminum is provided for the pelletizer housing. The cover 30 is pivotable relative to the side walls 28 around hinge 32. The cover 30 has a wiper 34 that extends into proximity with the cutter 14 to prevent a build up of pellets on cutter 14 when cover 30 is closed as shown in FIG. 1. Cover 30 also has a depending guard 36 which prevents operator entry into the feed rolls 18 and 20 when the cover is closed as indicated in FIG. 1. A hand knob 38 having a threaded end is captive in cover 30 and when hand knob 38 is threaded into a side wall 28 of the housing, it secures the cover 30 in its operating position.

An upstanding wall 40 which is part of the housing base 26 supports the bed knife 16 in close proximity to cutter 12. Wall 40 also has a curved section 40a which extends into close proximity with lower feed roll 20 and serves as a wiper for the lower feed roll to prevent the accumulation of plastic material on feed roll 20.

The housing of strand pelletizer 10 also includes a moveable end wall 42 which moves about a horizontal dowel pin 44 fixed to the base 26 of the pelletizer housing. Dowel pin 44 is received within an elongated slot 46 in the end wall 42 so that end wall 42 may be moved in a sliding manner away from the upstanding wall 40 of housing 26 and may thereafter be pivoted about the dowel pin 44 to the position shown in FIG. 2. End wall 42 is ordinarily held in place by threaded hand knobs 48 that are captive within the wall 42. The hand knobs 48 thread into threads 50 formed within the base 26 of the pelletizer 10.

The lower feed roll 20 is journaled for rotation in bearing blocks 52 that are, in turn, bolted to the movable end wall 42 by bolts 54. The upper feed roll 18 is journaled for rotation within bearing blocks 56 that are affixed to a sliding section 58 of movable end wall 42. Air cylinders 60 slide the bearing blocks 56 of upper feed roll 18 in a vertical direction to move the upper feed roll 18 toward and away from the lower feed roll 20. A strand inlet indicated generally at 62 is provided within the movable end wall 42 so that strands are fed between the feed rolls 18 and 20 for delivery to the cutter 12.

Figure 3:
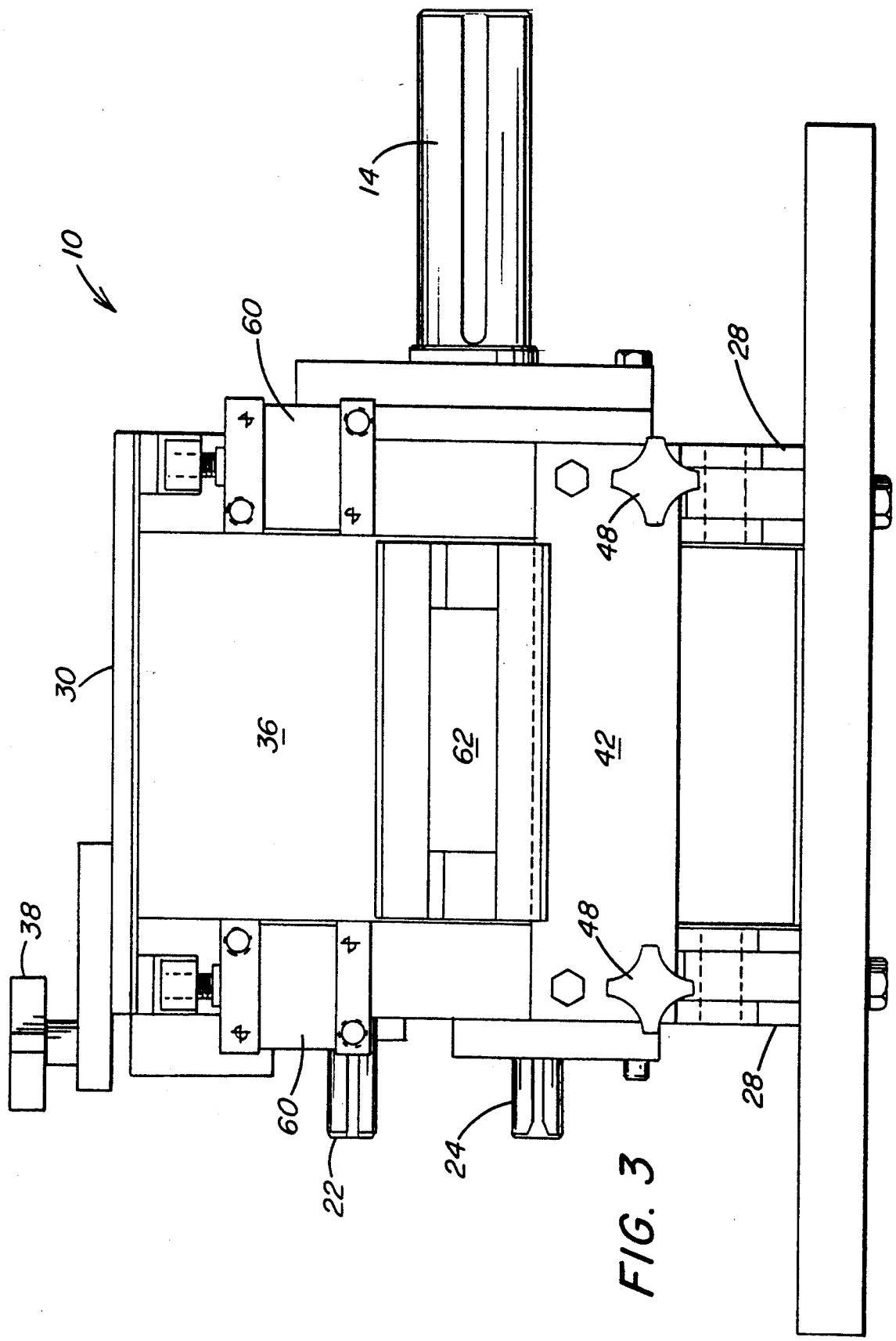
FIG. 3 is an end elevational view of the pelletizer as shown in FIG. 1 viewed from the inlet end of the pelletizer.

As viewed in FIGS. 1 and 3, the improved strand pelletizer 10 is positioned for cutting pellets. The feed rolls 18 and 20 receive strands through inlet 62 and bring them into contact with the helical cutter 12. The helical cutter 12 rotates in proximity to the bed knife 16 and chops the strands into cylindrical pellets. The pellets drop through the opening 27 in the base 26 of the pelletizer housing.

When it is time to provide for maintenance or cleaning of the components within the pelletizer cutting chamber, full access to the cutting chamber may be obtained without the use of tools. To obtain such access, the hand knob 38 which holds cover 30 in position is first loosened. Cover 30 is then pivoted in a clockwise direction as viewed in FIG. 1 to the position shown in FIG. 2. After cover 30 has been raised, the hand knobs 48 are loosened and the end wall 42 is first slidingly moved away from the cutter 12 over the dowel pin 44 and is then pivoted in a counterclockwise direction as viewed in FIG. 1 to the position shown in FIG. 2. When movable end wall 42 is so pivoted over dowel pin 44, the bearing blocks 52 and 56 that hold the feed rolls 18 and 20 may be removed from the end wall 42. Even if the feed rolls 18 and 20 are not removed from end wall 42, the movement of end wall 42 permits access to the area beneath lower feed roll 20 for cleaning. It has been determined that when plastic product is contaminated, a likely source of the contamination is the accumulation of material below the lower feed roll on a standard pelletizer in a space that is inaccessible and difficult to clean.

Figure 2:
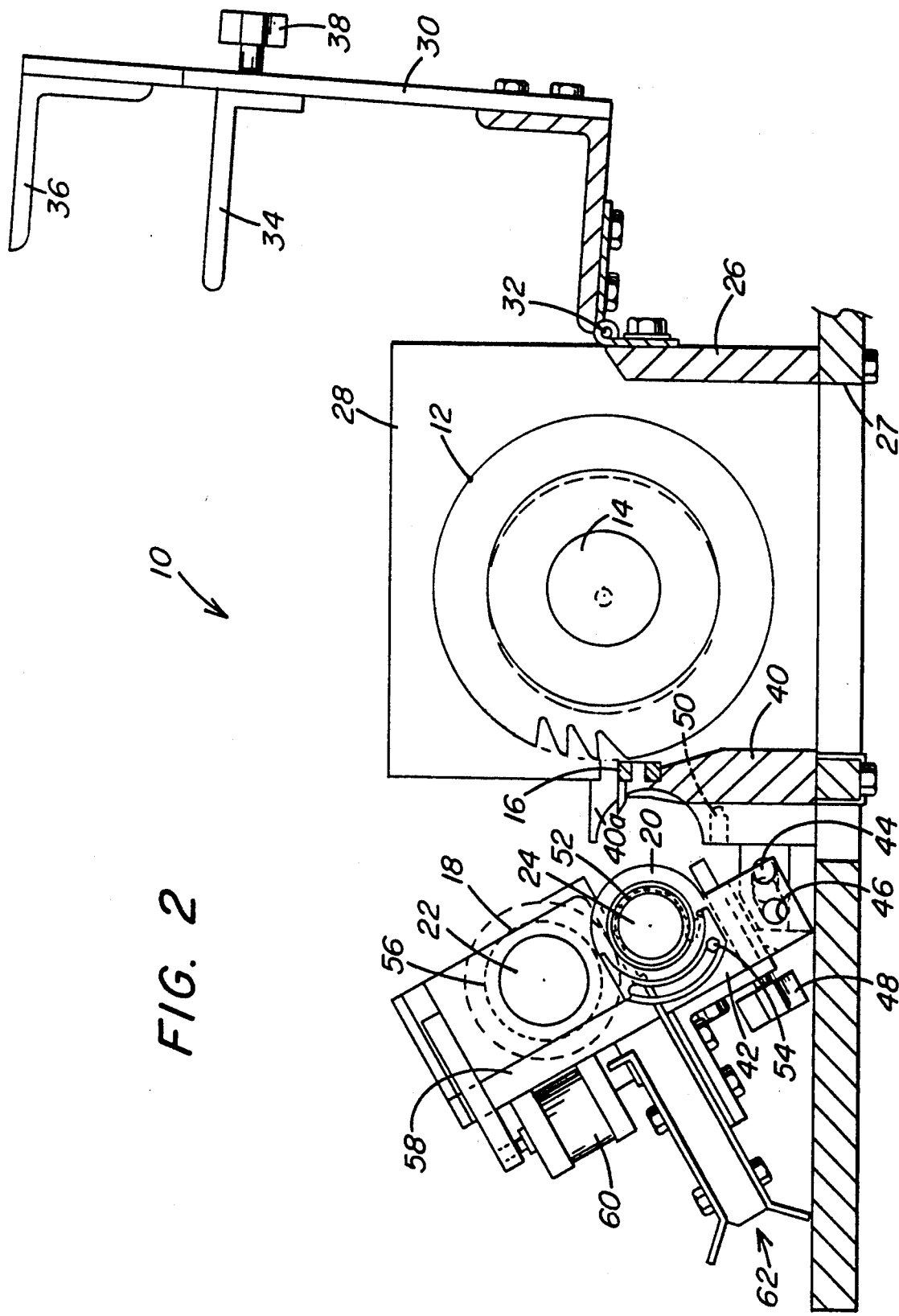
FIG. 2 is a elevational view similar to FIG. 1 showing the improved pelletizer with the housing opened to provide access to the cutting chamber.

To reassemble the strand pelletizer 10 to the operative position of FIG. 1 from the component-accessible position of FIG. 2, the reverse procedure is followed. The bearing blocks 52 and 56 are positioned within the end wall 42. The end wall 42 is then pivoted to a vertical position and slid to the right as viewed in FIG. 2. The hand knobs 48 and then tightened to maintain the end wall 42 in a vertical position. After end wall 42 has been positioned properly, the cover 30 is moved in a counterclockwise direction and the hand knob 38 is engaged and tightened.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. In a strand pelletizer for pelletizing extruded plastic strands comprising a cutter, a bed knife, and upper and lower feed rolls each mounted in mounting means for feeding strands to said cutter all housed within a cutting chamber, the improved apparatus comprising:

a three part housing, including a first part, a second part and a base, enclosing said cutting chamber;

said housing first part being pivotally secured to said housing base so that said housing first part may be pivoted away from said base to provide access to said cutter and a portion of said mounting means for said upper feed roll;

said housing second part retaining said upper feed roll and said lower feed roll and being slideably and pivotably mounted to said base to provide access to said feed rolls for maintenance and cleaning;

said housing first part and said housing second part having locking means for locking said housing first part and said housing second part to said housing base in closed positions and for readily unlocking said housing first and second parts from said housing base.

2. The improved apparatus of claim 1 wherein said locking means comprises threaded hand knobs that may be tightened and loosened by hand attached to the housing first and second parts.

3. The improved apparatus of claim 1 further comprising means for mounting said bed knife to said housing base such that said bed knife remains fixed relative to said housing base when said housing first part and said housing second part are moved relative to said housing base to provide access to said cutter and said upper and lower feed rolls.

4. The improved apparatus of claim 1 wherein said cutter is a helical cutter.

5. The improved apparatus of claim 1 wherein said lower feed roll is journaled for rotation in bearing blocks that are retained within said housing second part.

6. The improved apparatus of claim 5 wherein said lower feed roll bearing blocks are bolted to said housing second part.

7. The improved apparatus of claim 1 wherein said upper feed roll is journaled for rotation in bearing blocks that are shiftable relative to said lower feed roll.

8. In a strand pelletizer for pelletizing extruded plastic strands comprising a cutter, a bed knife, and upper and lower feed rolls each mounted in mounting means for feeding strands to said cutter all housed within a cutting chamber, the improved apparatus comprising:

a three part housing, including a cover, an end wall and a base, enclosing said cutting chamber;

said housing cover being pivotally secured to said housing base so that said housing cover may be pivoted away from said base to provide access to said cutter and a portion of said mounting means for said upper feed roll;

hand operated means for selectively locking said housing cover in a closed operating position relative to said base;

said housing end wall retaining said upper feed roll and said lower feed roll and being slideably and pivotably mounted to said base to provide access to said feed rolls for maintenance and cleaning;

hand operated means for selectively locking said housing end wall in a vertical operating position relative to said base;

said base having an upwardly projecting mounting means for fixedly positioning said bed knife relative to said cutter;

an inlet to said cutting chambers to direct plastic strands between said upper and lower feed rolls;

said upper and lower feed rolls being positioned to feed said plastic strands over said bed knife when said housing end wall is locked in its vertical operating position.

9. The improved apparatus of claim 8 wherein said hand operated means for locking said housing cover and said housing end wall are threaded hand knobs that may be tightened and loosened by hand.

10. The improved apparatus of claim 8 further comprising means for mounting said bed knife to said housing base such that said bed knife remains fixed relative to said housing base when said housing cover and said housing end wall are moved relative to said housing base to provide access to said cutter and said upper and lower feed rolls.

11. The improved apparatus of claim 8 wherein said cutter is a helical cutter.

12. The improved apparatus of claim 8 wherein said lower feed roll is journaled for rotation in bearing blocks that are retained within said housing end wall.

13. The improved apparatus of claim 12 wherein said lower feed roll bearing blocks are bolted to said housing end wall.

14. The improved apparatus of claim 8 wherein said upper feed roll is journaled for rotation in bearing blocks that are shiftable relative to said lower feed roll.

15. A strand pelletizer for pelletizing extruded plastic strands comprising a helical cutter, a bed knife, upper and lower feed rolls each mounted in mounting means comprising bearing blocks for feeding strands to said helical cutter and a housing forming a cutting chamber around said helical cutter, said bed knife and said upper and lower feed rolls;

said housing including a cover, an end wall and a base;

said housing cover being pivotably secured to said housing base so that said cover may be pivoted away from said base to provide access to said helical cutter and a portion of said mounting means for said upper feed roll;

a threaded hand knob for selectively locking said housing cover in a closed operating position relative to said base;

said upper and lower feed rolls each journaled for rotation in said bearing blocks;

said housing end wall retaining said upper feed roll bearing blocks and said lower feed roll bearing blocks and being slideably and pivotably mounted to said base to provide access to said feed rolls for maintenance and cleaning;

said upper feed roll bearing blocks being slideably mounted within said end wall;

said lower feed roll bearing blocks being bolted to said housing end wall;

threaded hand knobs for selectively locking said housing end wall in a vertical operating position relative to said base;

said base having an upwardly projecting mounting means for fixedly positioning said bed knife relative to said helical cutter;

an inlet to said cutting chamber to direct plastic strands between said upper and lower feed rolls;

said upper and lower feed rolls being positioned to feed said plastic strands over said bed knife when said housing end wall is locked in its vertical operating position.

16. The strand pelletizer of claim 15 wherein said housing cover is formed from aluminum.

17. The strand pelletizer of claim 15 wherein said housing base is formed from stainless steel.

* * * * *